(12) United States Patent
Lundy

(10) Patent No.: US 6,527,635 B1
(45) Date of Patent: Mar. 4, 2003

(54) GAME AND FISH CLEANING ENCLOSURE

(76) Inventor: Archie J. Lundy, 421 Knollwood St. #115, Annandale, MN (US) 55302

( * ) Notice: Subject to any disclaimer, the term of this patent is extended or adjusted under 35 U.S.C. 154(b) by 92 days.

(21) Appl. No.: 09/770,437

(22) Filed: Jan. 26, 2001

(51) Int. Cl.[7] ............................................... A22C 25/02
(52) U.S. Cl. ..................................................... 452/105
(58) Field of Search .................... 452/105, 98

(56) References Cited

U.S. PATENT DOCUMENTS

| | | | |
|---|---|---|---|
| 2,110,341 A | * 3/1938 | Rindt | 452/105 |
| 4,935,991 A | 6/1990 | Tourney | |
| D326,211 S | 5/1992 | Allen | |
| 5,279,257 A | * 1/1994 | Temby | 119/676 |
| 5,311,813 A | 5/1994 | Fairbanks et al. | |
| 5,318,472 A | * 6/1994 | Johnson | 452/101 |
| D376,737 S | 12/1996 | Hecker | |
| 5,897,433 A | * 4/1999 | Kendrick | 452/105 |

* cited by examiner

*Primary Examiner*—Charles T. Jordan
*Assistant Examiner*—Susan Piascik

(57) ABSTRACT

A game and fish cleaning enclosure for enabling anglers to clean their fish indoors without causing a mess. The game and fish cleaning enclosure includes a board member having a top and side ends; and also includes support members being removably connected to said board member; and further includes a canopy member being removably supported upon the support members.

4 Claims, 1 Drawing Sheet

GAME AND FISH CLEANING ENCLOSURE

BACKGROUND OF THE INVENTION

1. Field of the Invention

The present invention relates to a game and fish cleaning station and more particularly pertains to a new game and fish cleaning enclosure for enabling anglers to clean their fish indoors without causing a mess.

2. Description of the Prior Art

The use of a game and fish cleaning station is known in the prior art. More specifically, a game and fish cleaning station heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,311,813; U.S. Pat. No. 8,897,433; U.S. Pat. No. Des. 376,737; U.S. Pat. No. 5,318,472; U.S. Pat. No. 4,935,991; and U.S. Pat. No. Des. 326,211.

While these devices fulfill their respective, particular objectives and requirements, the aforementioned patents do not disclose a new game and fish cleaning enclosure. The inventive device includes a board member having a top and side ends; and also includes support members being removably connected to said board member; and further includes a canopy member being removably supported upon the support members.

In these respects, the game and fish cleaning enclosure according to the present invention substantially departs from the conventional concepts and designs of the prior art, and in so doing provides an apparatus primarily developed for the purpose of enabling anglers to clean their fish indoors without causing a mess.

SUMMARY OF THE INVENTION

In view of the foregoing disadvantages inherent in the known types of game and fish cleaning station now present in the prior art, the present invention provides a new game and fish cleaning enclosure construction wherein the same can be utilized for enabling anglers to clean their fish indoors without causing a mess.

The general purpose of the present invention, which will be described subsequently in greater detail, is to provide a new game and fish cleaning enclosure which has many of the advantages of the game and fish cleaning station mentioned heretofore and many novel features that result in a new game and fish cleaning enclosure which is not anticipated, rendered obvious, suggested, or even implied by any of the prior art game and fish cleaning station, either alone or in any combination thereof.

To attain this, the present invention generally comprises a board member having a top and side ends; and also includes support members being removably connected to said board member; and further includes a canopy member being removably supported upon the support members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to-be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new game and fish cleaning enclosure which has many of the advantages of the game and fish cleaning station mentioned heretofore and many novel features that result in a new game and fish cleaning enclosure which is not anticipated, rendered obvious, suggested, or even implied by any of the prior art game and fish cleaning station, either alone or in any combination thereof.

It is another object of the present invention to provide a new game and fish cleaning enclosure which may be easily and efficiently manufactured and marketed.

It is a further object of the present invention to provide a new game and fish cleaning enclosure which is of a durable and reliable construction.

An even further object of the present invention is to provide a new game and fish cleaning enclosure which is susceptible of a low cost of manufacture with regard to both materials and labor, and which accordingly is then susceptible of low prices of sale to the consuming public, thereby making such game and fish cleaning enclosure economically available to the buying public.

Still yet another object of the present invention is to provide a new game and fish cleaning enclosure which provides in the apparatuses and methods of the prior art some of the advantages thereof, while simultaneously overcoming some of the disadvantages normally associated therewith.

Still another object of the present invention is to provide a new game and fish cleaning enclosure for enabling anglers to clean their fish indoors without causing a mess.

Yet another object of the present invention is to provide a new game and fish cleaning enclosure which includes a board member having a top and side ends; and also includes support members being removably connected to said board member; and further includes a canopy member being removably supported upon the support members.

Still yet another object of the present invention is to provide a new game and fish cleaning enclosure that protects the tabletop or the countertop.

Even still another object of the present invention is to provide a new game and fish cleaning enclosure that allows the user to more quickly and conveniently clean one's fish.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
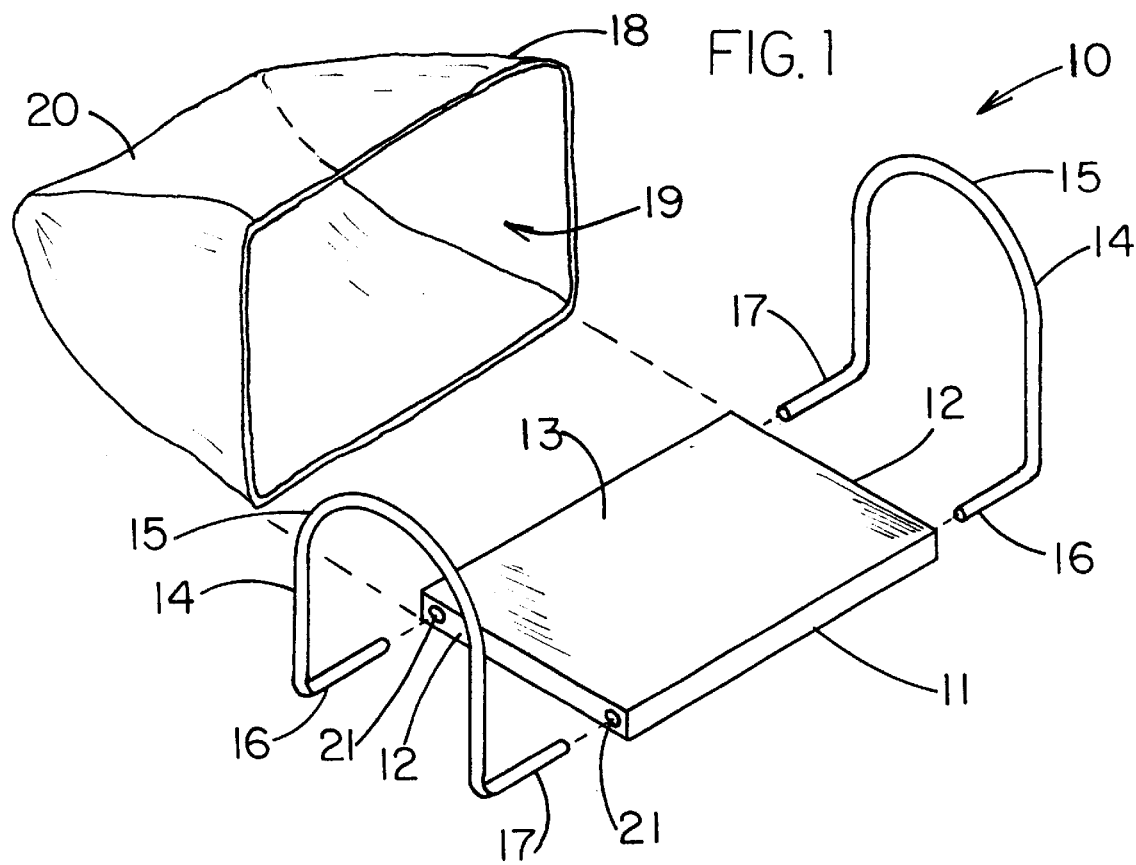
FIG. 1 is an exploded perspective view of a new game and fish cleaning enclosure according to the present invention.
Figure 2:
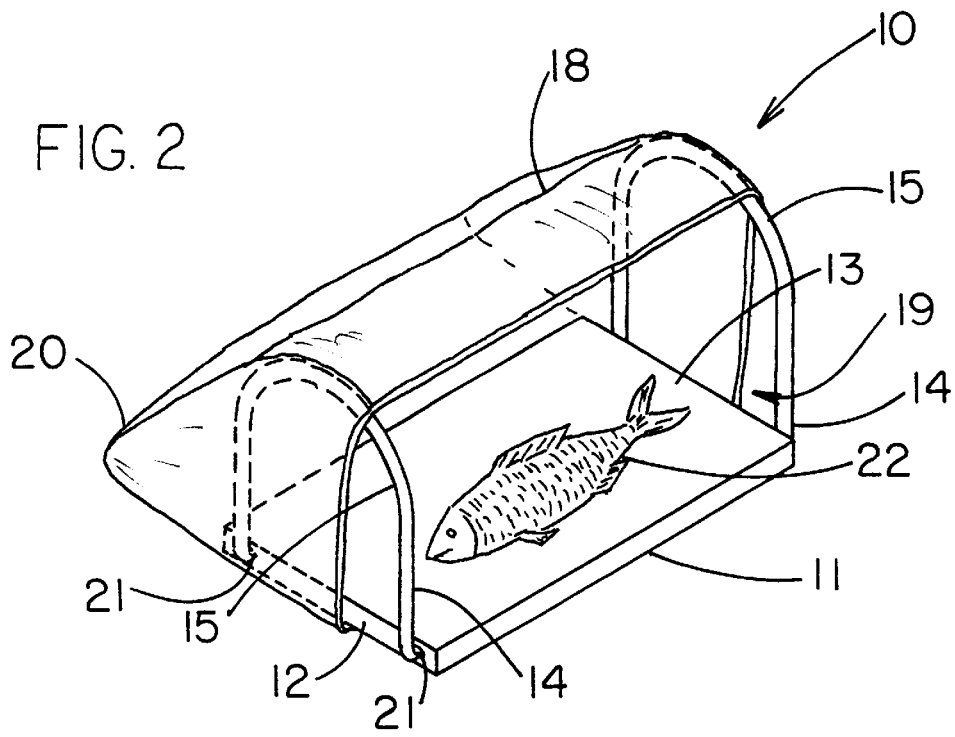
FIG. 2 is a perspective view of the present invention.

With reference now to the drawings, and in particular to FIGS. 1 through 2 thereof, a new game and fish cleaning enclosure embodying the principles and concepts of the present invention and generally designated by the reference numeral 10 will be described.

As best illustrated in FIGS. 1 through 2, the game and fish cleaning enclosure 10 generally comprises a board member 11 having a top 13 and side ends 12. The board member 11 includes slots 21 being spaced apart and being disposed in the side ends 12 thereof with the board having a length of approximately 28 inches, a width of approximately 8 inches, and a thickness of approximately ¾ inch.

Support members 14 are removably and conventionally connected to the board member 11. Each of the support members 14 includes an arched main portion 15 and elongate end portions 16, 17 which are angled outwardly and perpendicular to the arched main portion 15 and which are disposed parallel to one another. The elongate end portions 16, 17 are removably received in the slots 21 of the board member 11 with the arched main portion 15 being disposed upright along and above the side ends 12 of the board member 11.

A cover/waste-receptacle member 18 is removably supported upon the support members 14. The cover/waste-receptacle member 18 is a bag having an open front end 19 and a tapered and closed back end 20. The bag 18 is removably disposed upon the arched main portions 15 of the support members 14 and about a back end, bottom and the side ends 12 of the board member 11 and being disposed between the support members 14 above the board member 11 thus forming the game and fish cleaning shelter 10 having an open front end.

In use, the user places his/her game 22 upon the board member 11 through the open front end of the game and fish cleaning shelter 10 and cleans the game upon the board member 11, and upon finishing, the user places the waste of the game in the bag 18 and removes the bag 18 from about the support members 14 and the board member 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A game and fish cleaning shelter comprising:
   a board member having a top and side ends, said board member includes slots being disposed in said side ends thereof;
   support members removably connected to said board member;
   a disposable cover/waste-receptacle member being removably supported upon said support members; and
   each of said support members includes an arched main portion and elongate end portions which are angled outwardly and perpendicular to said arched main portion and which are disposed parallel to one another, said elongate end portions being removably received in said slots of said board member with said arched main portion being disposed upright along and above said side ends of said board members.

2. A game and fish cleaning shelter as described in claim 1, wherein said disposable cover/waste-receptacle member is a bag having an open front end and closed back end, said bag being removably disposed upon said arched main portions of said support members and about a back end, bottom and said side ends of said board member and being disposed between said support members above said board member thus forming said game and fish cleaning shelter having an open front end.

3. A game and fish cleaning shelter comprising:
   a board member having a top and side ends, said board member including slots being disposed in said side ends thereof;
   support members being removably connected to said board member, each of said support members including an arched main portion and elongate end portions which are angled outwardly and perpendicular to said arched main portion and which are disposed parallel to one another, said elongate end portions being removably received in said slots of said board member with said arched main portion being disposed upright along and above said side ends of said board member; and
   a disposable cover/waste-receptacle member being removably supported upon said support members, said disposable cover/waste-receptacle member being a bag having an open front end and a tapered and closed back end, said bag being removably disposed upon said arched main portions of said support members and about a back end, bottom and said side ends of said board member and being disposed between said support members above said board member thus forming said game and fish cleaning shelter having an open front end.

4. A method of cleaning game and fish comprising:

providing a board member having a top surface and side ends, said board member being for receiving game and fish to be cleaned, said board member providing a cutting surface for cleaning the game and fish, said board member including slots being disposed in said side ends thereof;

providing a pair of support members removably couplable to said board member, each of said support members including an arched main portion and elongate end portions which are angled outwardly and perpendicular to said arched main portion and which are disposed parallel to one another;

positioning each one of said elongate end portions in an associated one of said slots of said board member with said arched main portion being disposed upright along and above said side ends of said board member;

providing a plurality of a disposable cover/waste-receptacle member being removably supported upon said support members, said disposable cover/waste-receptacle member being a garbage bag having an open front end and a closed back end;

positioning one of said plurality of garbage bag upon said arched main portions of said support members and about a back end, bottom and said side ends of said board member and being disposed between said support members above said board member thus forming said game and fish cleaning shelter having an open front end;

positioning the game or fish to be cleaning on said board member;

cleaning the game or fish in a conventional manner;

scrapping any waste created during said step of cleaning into said garbage bag;

removing said garbage bag from said support members; securing said open front end of said garbage bag whereby said garbage bag is sealed; and disposing of said garbage bag with the waste contained therein.

* * * * *